ELECTRONIC COUNTER

Filed Nov. 3, 1961 3 Sheets-Sheet 1

INVENTOR:
EDWARD C. DOWLING
BY
Curtis, Morris & Safford
ATTORNEYS.

Nov. 23, 1965 E. C. DOWLING 3,219,986

ELECTRONIC COUNTER

Filed Nov. 3, 1961 3 Sheets-Sheet 2

INVENTOR:
EDWARD C. DOWLING

Curtis, Morris & Safford
ATTORNEYS.

Nov. 23, 1965 E. C. DOWLING 3,219,986

ELECTRONIC COUNTER

Filed Nov. 3, 1961 3 Sheets-Sheet 3

INVENTOR
EDWARD C. DOWLING
BY
Curtis, Morris & Safford
ATTORNEYS.

United States Patent Office 3,219,986

Patented Nov. 23, 1965

3,219,986
ELECTRONIC COUNTER

Edward C. Dowling, Harrisburg, Pa., assignor to AMP Incorporated, Harrisburg, Pa., a corporation of New Jersey Filed Nov. 3, 1961, Ser. No. 149,945
8 Claims. (Cl. 340—174)

Figure 1A:
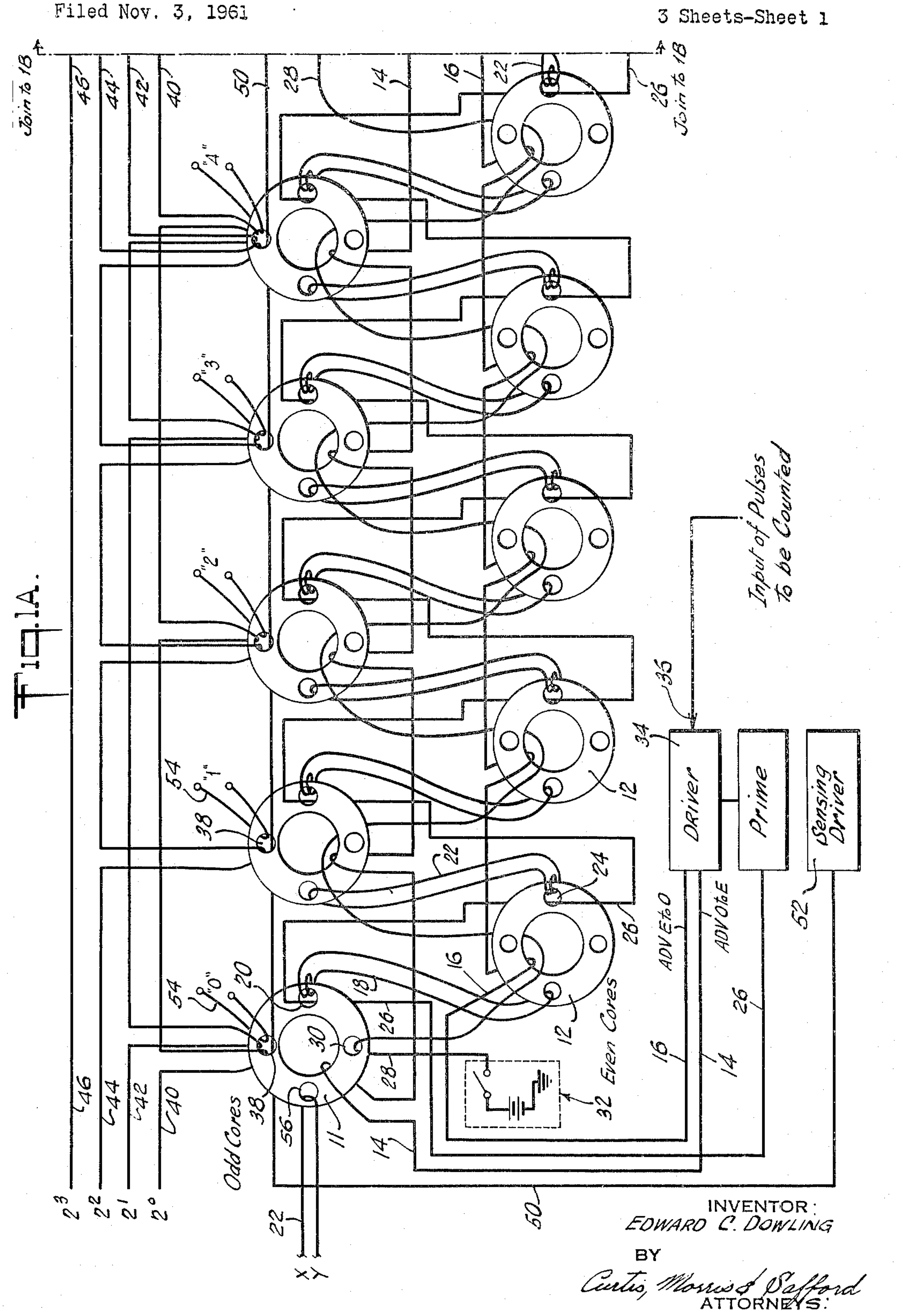

This invention relates to a device for counting electrical pulses and the like.

An object of this invention is to provide an improved device which counts electrical pulses one by one and gives a binary output count, such as binary coded decimal corresponding to the decimal count.

Another object is to provide such a counter which gives a true decimal count output simultaneously with the binary coded output.

Still another object is to provide a simple yet very efficient binary coded counter using connecting wires and magnetic cores only.

A further object is to provide such a counter which is compatible with existing equipment and technology.

These and other objects will in part be pointed out and in part understood from the description given hereinafter.

A binary counter is a device which receives electrical impulses and in response gives an output signal in binary code indicative of the number of pulses received. There are many types of binary code, and one of the more common is that known as Elecom 120A, excess 3, binary coded decimal (BCD). For the sake of illustration the invention will be described in connection with this particular code.

Elecom 120A, excess 3, BCD code is illustrated as follows:

| $2^3$ | $2^2$ | $2^1$ | $2^0$ | Decimal |
|---|---|---|---|---|
| 0 | 0 | 1 | 1 | 0 |
| 0 | 1 | 0 | 0 | 1 |
| 0 | 1 | 0 | 1 | 2 |
| 0 | 1 | 1 | 0 | 3 |
| 0 | 1 | 1 | 1 | 4 |
| 1 | 0 | 0 | 0 | 5 |
| 1 | 0 | 0 | 1 | 6 |
| 1 | 0 | 1 | 0 | 7 |
| 1 | 0 | 1 | 1 | 8 |
| 1 | 1 | 0 | 0 | 9 |

In the above table the decimal numbers between 0 and 9 are given in the last column, and the corresponding binary digits of the binary code equivalents in the remaining columns. Now it will be seen that the least significant binary digit ($2^0$) in going down its column alternates one, zero, one, etc. The next digit ($2^1$) alternates by twos (zero, zero, one, one, zero, etc.); the next digit ($2^2$) by fours; and the next by eights, and so on.

In one type of magnetic core shift register, the cores are arranged in odd and even groups with a core in one group connected to a core in the other group, and so on. By energizing the cores with a proper sequence of advance currents, binary information stored in one core in the form of magnetic flux is transmitted to the next core, and from core to core down the register. One complete cycle of operation of such a register comprises shifting information from an odd numbered core temporarily to an even numbered core and then to the next odd core. The present invention uses a modified shift register of this kind, the position of a single binary "one" in the register serving to indicate the "count" of input pulses applied to the counter circuit.

In accordance with the present invention, in one specific embodiment thereof, twenty multi-aperture magnetic cores (MAD's) are connected in a modified ten bit shift register. At the beginning of operation, all of the cores are set with zero except the initial or "zeroth" core in which a one is stored. The shifting of this single one is controlled by a driver unit which applies to the cores alternate odd and even advance current pulses. This driver in turn is triggered by input pulses to be counted. With the first such pulse, the driver applies an advance current to the odd numbered cores in the circuit and then an advance current to the even cores. This shifts the binary one previously stored in the initial core to the next odd core, which corresponds to decimal "1." Thereafter, the next input pulse to the driver causes the shifting of the binary one to the next odd core, and so on. After a given number of input pulses, for example, 7, the binary one will be stored in the corresponding core of the sequence, in this case, the decimal seventh.

Now, the cores in the counter are threaded with readout windings corresponding to the digits in the binary code illustrated above. The first of these windings, corresponding to the least significant digit ($2^0$), threads every other odd core beginning with the one corresponding the decimal "0"; the next readout winding threads two successive odd cores, then skips two cores, and threads the next two cores, etc. In the same manner the remaining readout windings thread the cores in the sequences indicated for the corresponding binary digit in the table given above. Assuming that the single binary one has been shifted to the decimal seventh core the readout windings will signal "1010." For the next decimal count (8), the readout windings will signal "1011." Thus, for each count, the corresponding BCD code is immediately available on the readout windings threading the cores. Simultaneously, the corresponding pure decimal count is obtained by threading each odd core, respectively, by a separate output winding.

Figure 1B:
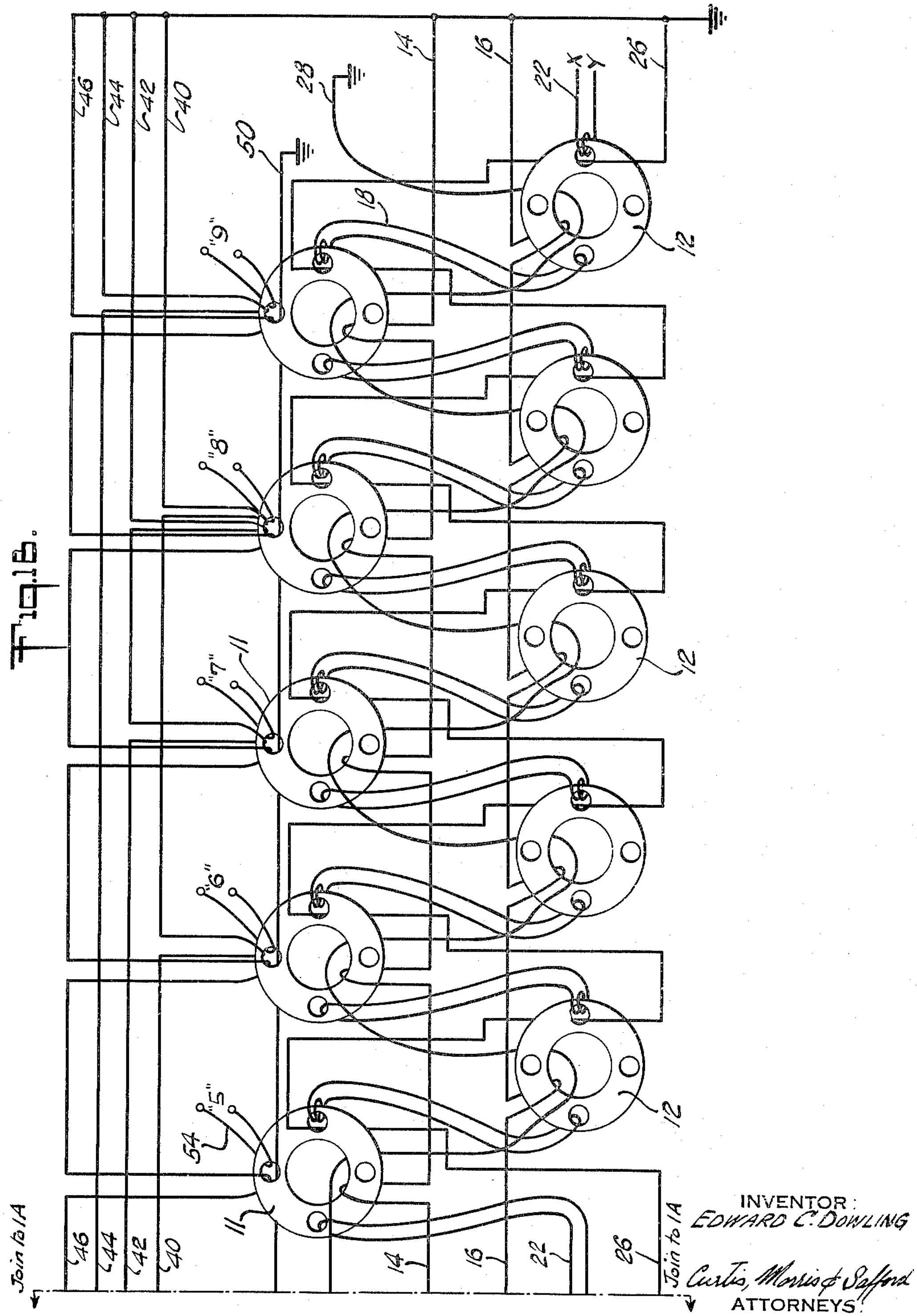
Figure 2:
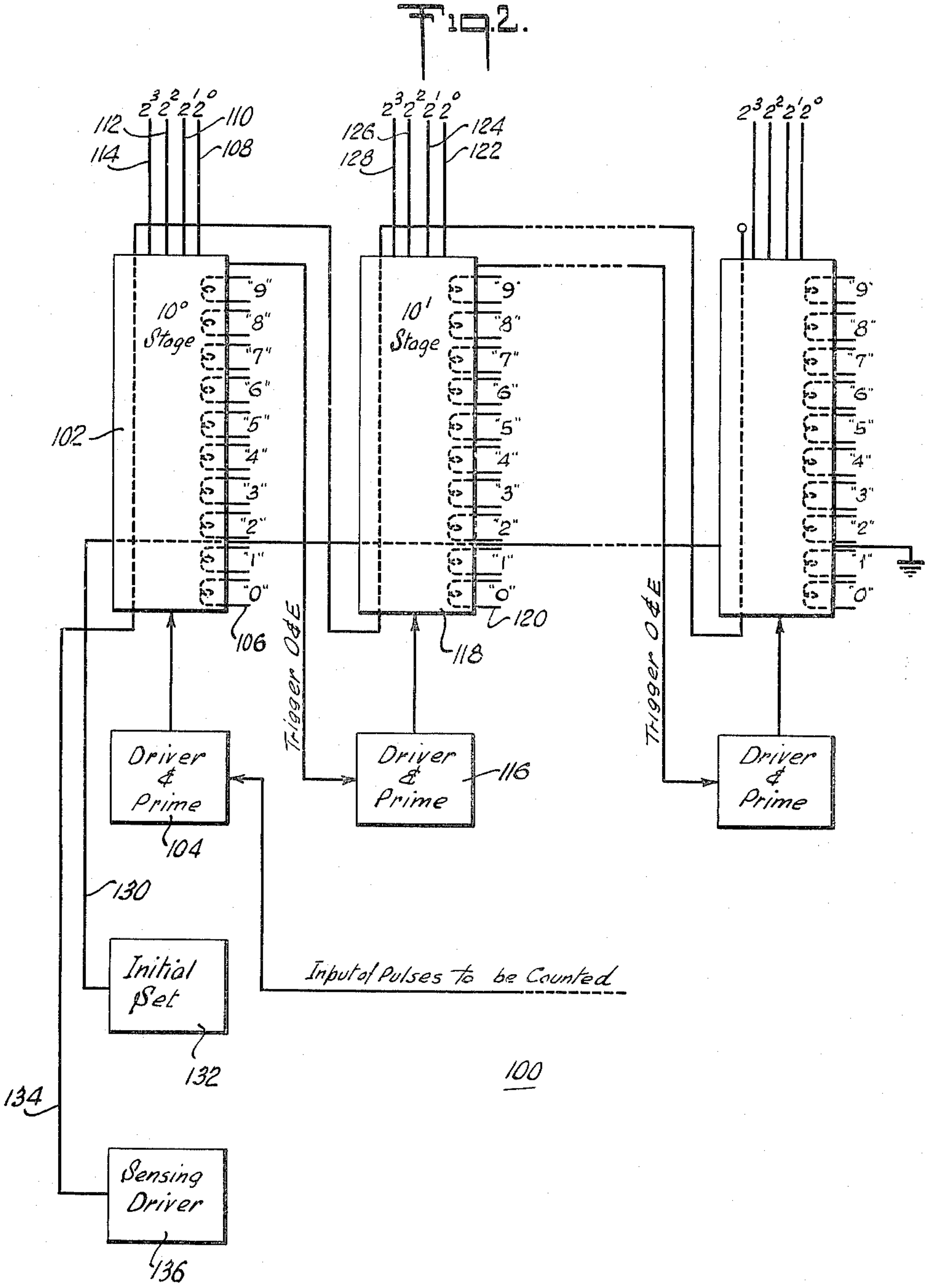

A better understanding of the invention together with a fuller appreciation of its many advantages will best be gained from the following description given in connection with the accompanying drawings in which:

FIGURES 1A and 1B are diagrams of a magnetic core counter circuit embodying features of the invention, and FIGURE 2 is a diagram of a multi-stage counter embodying features of the invention.

The circuit 10 in FIGURE 1 of the drawings includes twenty multi-aperture magnetic cores (MAD's) which are evenly divided into a group of odd cores 11 and a group of even cores 12. The cores in the upper or odd group correspond to the decimal digits "0" through "9" and have been labeled accordingly. The twenty cores are connected in series as a ten bit shift register, the odd numbered cores being threaded through their major apertures by an advance 0 to E drive winding 14, the even numbered cores being similarly threaded by an advance E to 0 drive winding 16. The first or "0" odd core is connected to the next even core by a respective one of coupling windings 18, which threads a minor output aperture 20 of the first core and the major aperture of the next. Each even core 12 is coupled to the next odd core 11 by a respective one of coupling windings 22, each winding threading a minor output aperture 24 of an even core and the major aperture of the next odd core. Output minor apertures 20 and 22 are also threaded by a prime winding 26, which is in series with the advance windings. For a more detailed description of this general wiring of the circuit, the reader is referred to U.S. Patent 2,995,731.

The operation of circuit 10 is as follows. Prior to a counting operation all of the cores are cleared, i.e. saturated with flux in the clockwise direction, except the first odd or "0" core of the circuit which is pre-set with a binary one. This is done by means of a signal applied to an input winding 28 threading a minor input aperture 30 of the "0" core. Winding 28 is connected to a pulse generator, generally indicated at 32, which may be manually actuated, or which can be controlled automatically at the beginning of a count operation. This winding also threads the major apertures of the other cores in the circuit, and when a one is set into the first core, the others are cleared.

Each of advance drive windings 14 and 16 is connected to a respective output of a driver unit 34. This is a current pulse generator which in response to a triggering signal applied to its input 36 applies a drive current to advance 0 to E winding 14 and then a drive current to advance E to 0 winding 16. Several drivers suitable for this purpose are known in the art. A particularly suitable one, which also serves to apply prime current to winding 26 in proper synchronism with the advance drive currents, is disclosed in U.S. application Serial No. 52,295, filed August 26, 1960.

Now, when a first pulse to be counted is applied to driver input 36, the binary one which had been stored in the first odd or "0" core, is shifted, in known manner, to the next odd or "1" core. This represents an input decimal count of "one." This count in turn is now put into binary coded decimal (BCD) form by circuit 10 as follows.

Each of core 11 is threaded through a minor readout aperture 38 by one or more of four windings 40, 42, 44, and 46 as indicated. Winding 40 serves to indicate the "$2^0$" digit of the BCD readout. Similarly winding 42 indicates the "$2^1$" digit, winding 44 the "$2^2$" digit and winding 46, the "$2^3$" digit. It will be seen that each of these windings threads respective ones of core 11 in the pattern indicated by the code table given previously. Now, when the binary one which had been stored in the initial or "0" core of the circuit is shifted to the next odd or "1" core, an output signal pulse will be generated in winding 44 since this winding threads aperture 38 of this core. But, since none of the remaining cores in the circuit receives a binary one at this time (there is only a single "one" in the cores of circuit 10), none of windings 40, 42, and 46 receives a signal. Subsequently, when a second pulse to be counted is applied to input 36, the binary one now stored in the "1" core, will be shifted to the next odd or "2" core and corresponding BCD signals, will appear on windings 40, 42, 44, and 46. The core location of the single binary one in circuit 10 is easily obtained by threading each of odd cores 11 through its aperture 38 with a respective one of readout windings 54. Thus these windings give a true decimal count. If desired, static or command readout of the BCD count and simultaneously the decimal count is accomplished by threading readout minor apertures 38 of cores 11 with an additional winding 50 to which is applied a suitable A.C. current from a sensing driver unit 52. No signal will be induced in BCD windings 40, 42, 44, and 46 or decimal windings 54 from those cores in which no binary one is set, whereas there will be a signal induced in corresponding ones of these windings from the single core containing the one. The general technique for static or command readout of a stored one in a MAD core is known in the art.

After circuit 10 has counted up to "9," it is reset to count the next decade, and so on. This is accomplished by connecting the output winding 22 of the last even core in the circuit back to an input minor aperture 56 of the initial odd or "0" core. Of course, to count beyond "9" with a single stage circuit additional cores can be used. Also, circuit 10 can be wired using a different pattern for the readout windings 40–46 to give a different binary coded count.

FIGURE 2 shows a multi-stage counter 100 wherein a number of counter stages, each like counter circuit 10, are connected together. The left-most or first stage 102, which is driven by a driver and prime unit 104, counts each input pulse applied to unit 104. Each count of "0" through "9" is indicated by stage 102 by means of decimal windings 106 and by BCD windings 108, 110, 112, and 114. These windings correspond to decimal windings 54, and BCD windings 40, 42, 44, and 46 of circuit 10.

When the count in stage 102 reaches "9" and then goes back to "0" (in the same way as with circuit 10), on the occurrence of the next input pulse applied to unit 104, a trigger signal from the last odd or the "9" core in stage 104 is applied to a driver unit 116. This trigger pulse is derived from an additional winding, like winding 18 on the "9" core in circuit 10, and occurs when the "9" core of stage 102 is cleared by an advance 0 to E current pulse from unit 104. Driver 116, for each trigger pulse applied to it, applies a prime, an advance 0 to E, a prime, and an advance E to 0 drive current in timed sequence to a second counter stage 118. This causes a single one stored in stage 118 to advance from one odd core to the next. Since driver unit 116 receives a trigger pulse only after stage 102 has counted "0" to "9" each time, stage 116 counts every tenth input pulse applied to driver 104. Thus, whereas stage 102 counts units, stage 118 counts tens. Stage 118 is provided with decimal readout windings 120 and with BCD windings 122, 124, 126, and 128.

Counter stage 118 can in turn be connected to another stage, and so on for as many stages as desired. All of the stages are threaded by an initial set winding 130 which corresponds to winding 28 in circuit 10. Here winding 130 is energized by a setting driver 132 prior to a counting operation. In the initial condition of the circuit a single binary one is stored in the "0" core of stage 102, a single binary one of the "0" core of the next stage, and so on. All of the remaining cores of the stages are cleared.

The odd cores of the various stages of counter 100 are threaded in series by a sensing winding 134 which, to give command readout on the decimal and BCD windings of the stages, is energized by an A.C. signal from a sensing driver 136. Winding 134 functions in the same way as winding 50 in circuit 10.

The above description is intended in illustration and not in limitation of the invention. Various changes or modifications in the embodiments illustrated may occur to those skilled in the art and these can be made without departing from the spirit or scope of the invention as set forth.

I claim:

1. A magnetic core counter of the character described comprising: a plurality of magnetic cores, means for initially setting a unique bit information into said cores, coupling loop means for shifting said information from one core to the next and so on, driver means having an input and including a winding threading said cores for applying a drive current pulse to said cores in response to a trigger signal applied to said input, and a plurality of readout windings corresponding respectively to digits of a desired binary code, said windings threading said cores in a pattern according to the code, the number of trigger signals applied to said input being counted by binary signals appearing on said readout windings, at least certain of said readout windings threading more than one of said cores, said readout windings sensing in coded pattern said cores and at the one core where the information is located providing bit signals in code which correspond to the actual number of input signals, a first one of said readout windings corresponding to the first digit of the coded number, a second of said readout windings corresponding to the second digit of the coded number, and so on.

2. The counter in claim 1 wherein each core is also threaded with a respective decimal readout winding.

3. A magnetic core counter comprising a plurality of multi-aperture magnetic cores, coupling loops respectively connecting an output minor aperture of an initial core to a receiving aperture of the next and so on, drive winding means for driving the cores to clear condition and for advancing a bit of information stored in one core to the next and so on, means for initially setting a bit of information into the initial core, input counting means for energizing said winding means with the occurrence of input signals to be counted, and a plurality of readout windings threading respective cores in a pre-determined code pattern, at least certain of said readout windings threading more than one of said cores, said readout windings sensing in coded pattern said cores and at the one core where the information is located providing bit signals in code which correspond to the actual number of input signals, a first one of said readout windings corresponding to the first digit of the coded number, a second of said readout windings corresponding to the second digit of the coded number, and so on.

4. The counter in claim 3 wherein said readout windings thread respective ones of minor output apertures of said cores, and sensing winding means threading said minor output apertures to provide substantially continuous readout signals on said readout windings.

5. A multi-stage counter comprising a first stage having a plurality of memory units connected in a shifting sequence, driver means having an input and connected to energize said units to shift an information bit from one unit to the next each time the input of said driver means is energized by a trigger signal, a second stage like the first and having driver means connected to it, means to apply a trigger signal from the last unit of said first stage to the driver means of said second stage, means to initially set a single information bit into said first stage and into said second stage, a first plurality of readout means connected to sense the units in said first stage and to give in parallel a plurality of binary coded signals corresponding to the position of the information bit along the first stage, and a second plurality of readout means connected to sense the units in said second stage and to give in parallel a plurality of binary coded signals corresponding to the position of the information bit along the second stage.

6. A magnetic core counter comprising a plurality of multi-aperture magnetic cores connected in sequence and having readout, transmitting and receiving apertures, coupling loops respectively connecting a transmitting aperture of one core to a receiving aperture of a succeeding core and so on, drive winding means for driving the cores to initial condition and for advancing a bit of information stored in one core to the next, means for initially setting a single bit of information in the first core of the sequence, the position of the bit along the sequence of cores being indicative of a number count, input means for actuating said drive winding means to advance the bit of information along the sequence of cores in accordance with time-spaced input signals to be counted, and a plurality of readout windings threading said readout apertures in a predetermined pattern, at least certain of said readout windings threading more than one of said apertures, said readout windings sensing in coded pattern said readout apertures and at the one aperture where the bit is located providing bit signals in code which correspond to the actual number of input signals, a first one of said readout windings corresponding to the first digit of the coded number, a second of said readout windings corresponding to the second digit of the coded number, and so on.

7. An arrangement for counting input pulses comprising, a plurality of memory elements connected in a shifting serial circuit, means for settnig a unit bit of information in said elements, means for advancing the bit along the circuit from one memory element to the next, and readout leads for sensing said elements and for generating in parallel a plurality of binary coded output signals corresponding to the position of the information bit along the serial circuit, at least certain of said readout leads connecting to more than one of said memory elements, said readout leads sensing in coded pattern said elements and at the one element where the information is located providing bit signals in code which correspond to the actual number of input signals, a first one of said readout leads corresponding to the first digit of the coded number, a second of said readout leads corresponding to the second digit of the coded number, and so on.

8. The arrangement in claim 7 comprising in further combination a second serial circuit of memory elements similar to the first, means for setting a tens information bit in the second circuit, means for advancing the tens bit in the second circuit each time the unit bit in the first circuit completely traverses the first circuit, and readout means for sensing the elements in the second circuit and for generating in parallel with said first circuit's coded output signal a second plurality of binary coded output signals corresponding to the position of the tens bit along the second circuit, whereby a very large count of pulses can be provided using a plurality of memory elements much smaller in total number than said count.

References Cited by the Examiner

UNITED STATES PATENTS

| | | | |
|---|---|---|---|
| 2,733,860 | 2/1956 | Rajchman | 340—347 |
| 2,846,671 | 8/1958 | Yetter | 340—347 |
| 2,953,778 | 9/1960 | Anderson et al. | 340—347 |
| 2,962,704 | 11/1960 | Buser | 340—347 |
| 2,968,795 | 1/1961 | Briggs et al. | 340—174 |
| 2,995,731 | 8/1961 | Sweeney | 340—174 |
| 3,077,585 | 2/1963 | Butler | 340—174 |
| 3,081,453 | 3/1963 | Nitzan | 340—347 |
| 3,141,153 | 6/1964 | Klein | 340—173 |
| 3,156,901 | 11/1964 | Kline | 340—173 |

OTHER REFERENCES

Publication I, Proceedings of the IRE, February 1956, pages 158–160.

IRVING L. SRAGOW, *Primary Examiner.*